Figure 5:
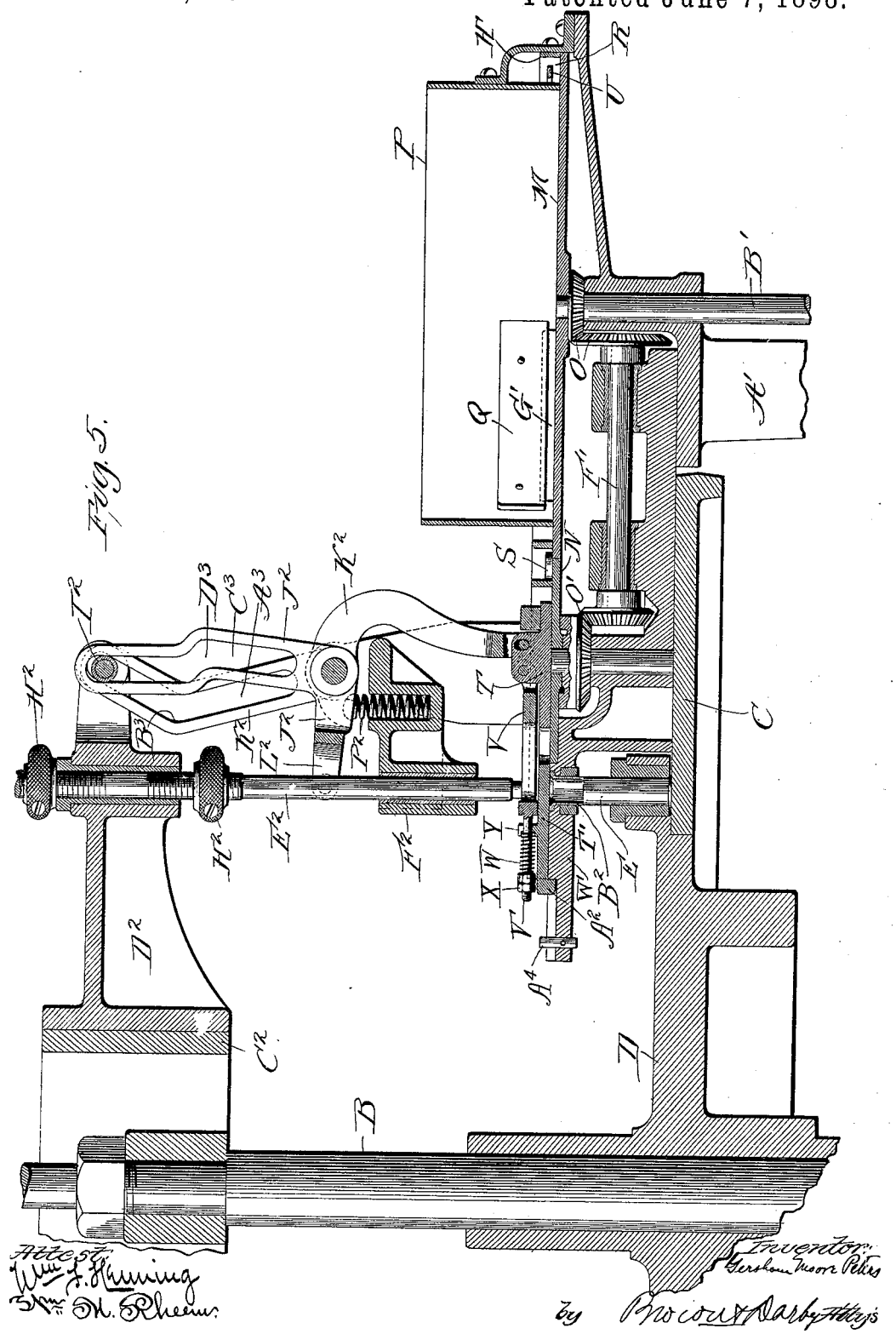

(No Model.)  6 Sheets—Sheet 1.
G. M. PETERS.
WAD PLACING MECHANISM FOR CARTRIDGE MACHINES.
No. 605,258. Patented June 7, 1898.
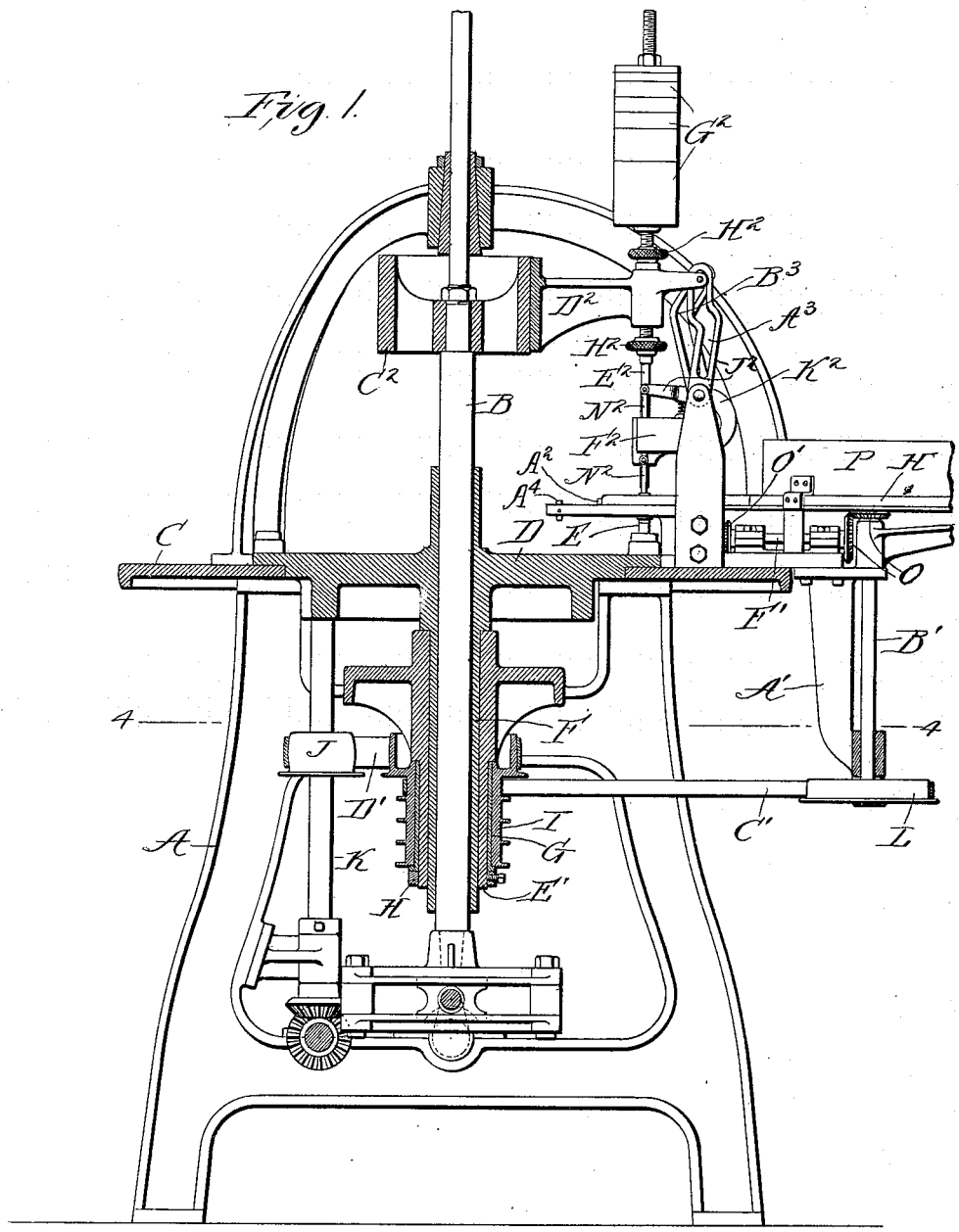
Attest:
Wm. F. Henning
Wm. M. Rheem
Inventor:
Gershom Moor Peters
by Moron & Darby
Atty's
THE NORRIS PETERS CO., PHOTO-LITHO., WASHINGTON, D. C.

(No Model.)  6 Sheets—Sheet 2.
G. M. PETERS.
WAD PLACING MECHANISM FOR CARTRIDGE MACHINES.
No. 605,258.  Patented June 7, 1898.
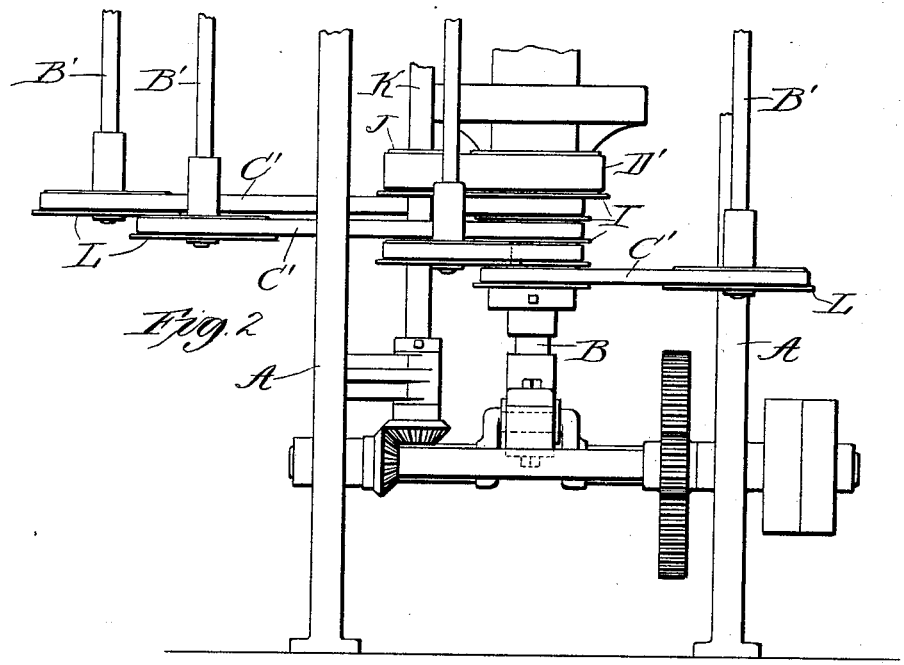
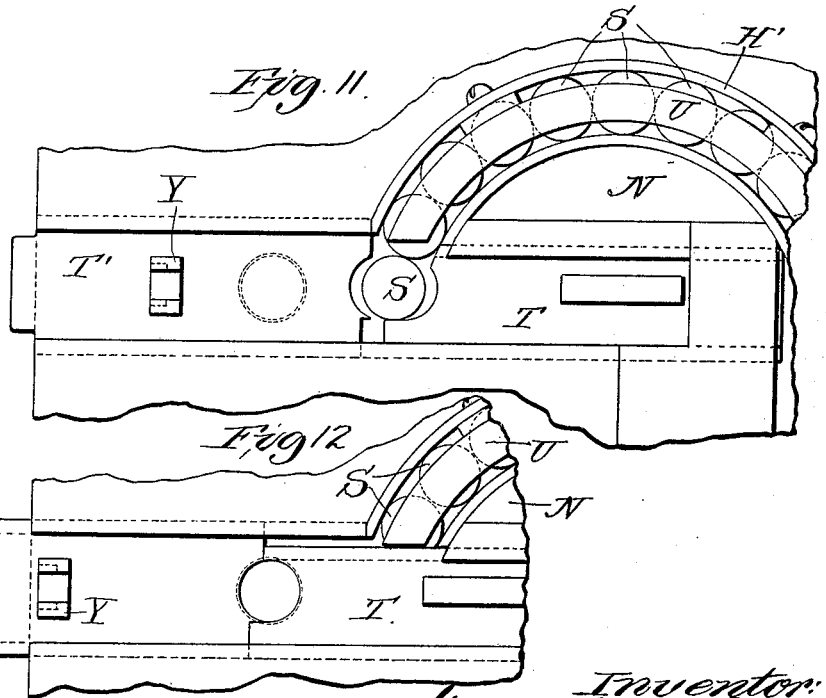

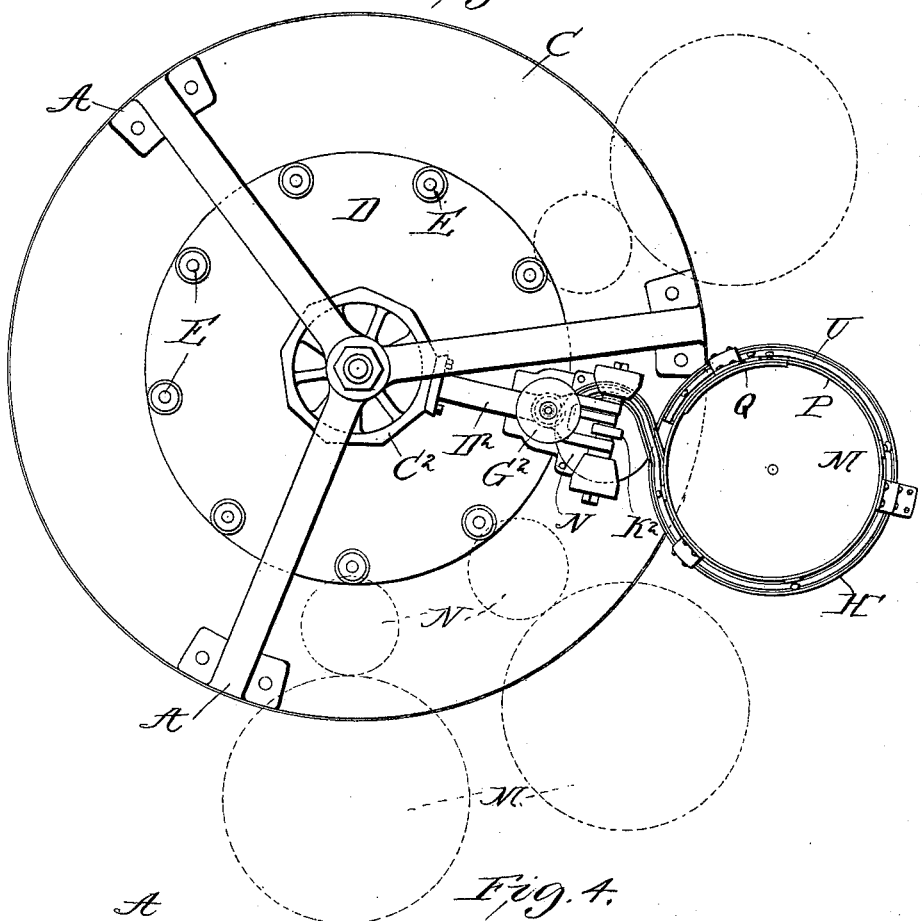
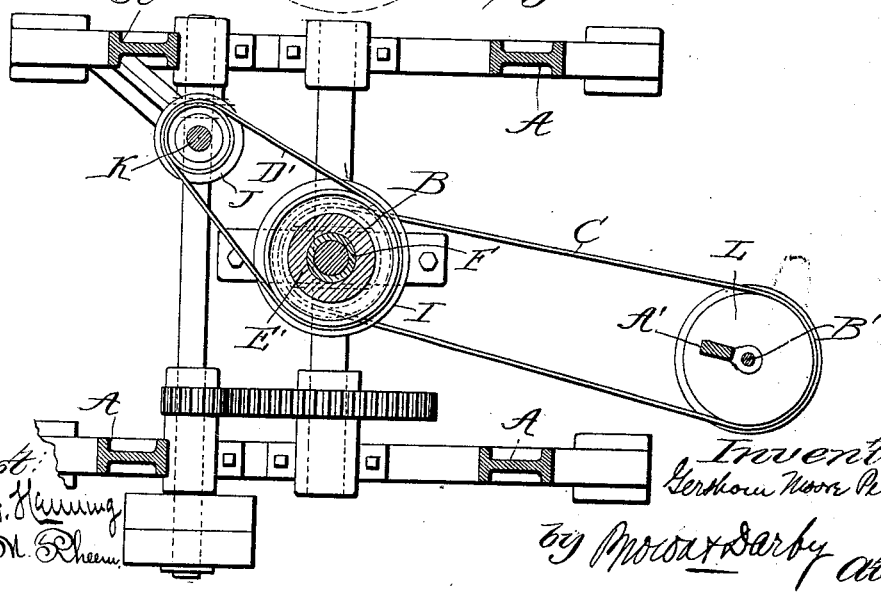

(No Model.) 6 Sheets—Sheet 4.

G. M. PETERS.
WAD PLACING MECHANISM FOR CARTRIDGE MACHINES.

No. 605,258. Patented June 7, 1898.

(No Model.) 6 Sheets—Sheet 5.
G. M. PETERS.
WAD PLACING MECHANISM FOR CARTRIDGE MACHINES.
No. 605,258. Patented June 7, 1898.
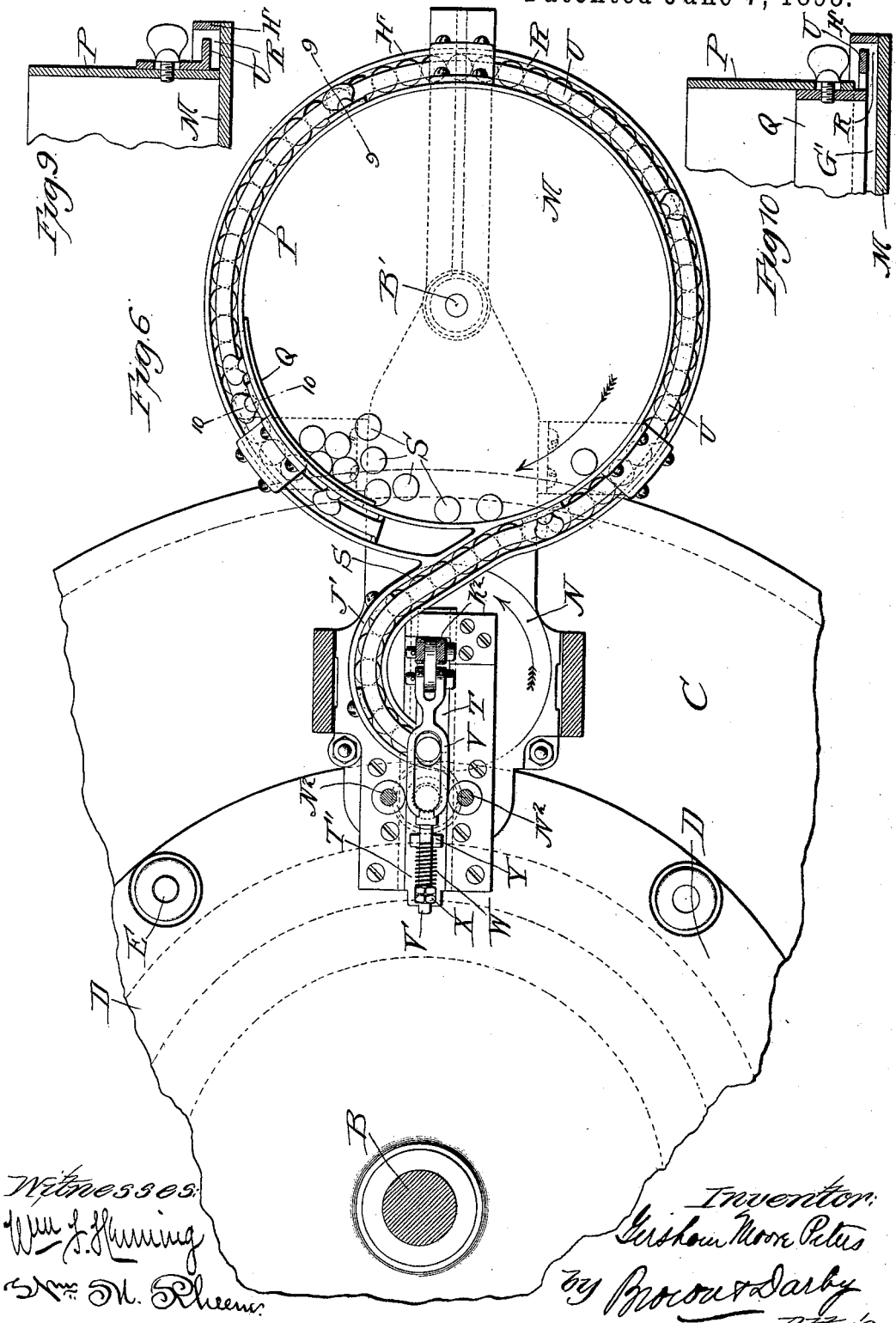

(No Model.)
G. M. PETERS.
WAD PLACING MECHANISM FOR CARTRIDGE MACHINES.
No. 605,258. Patented June 7, 1898.
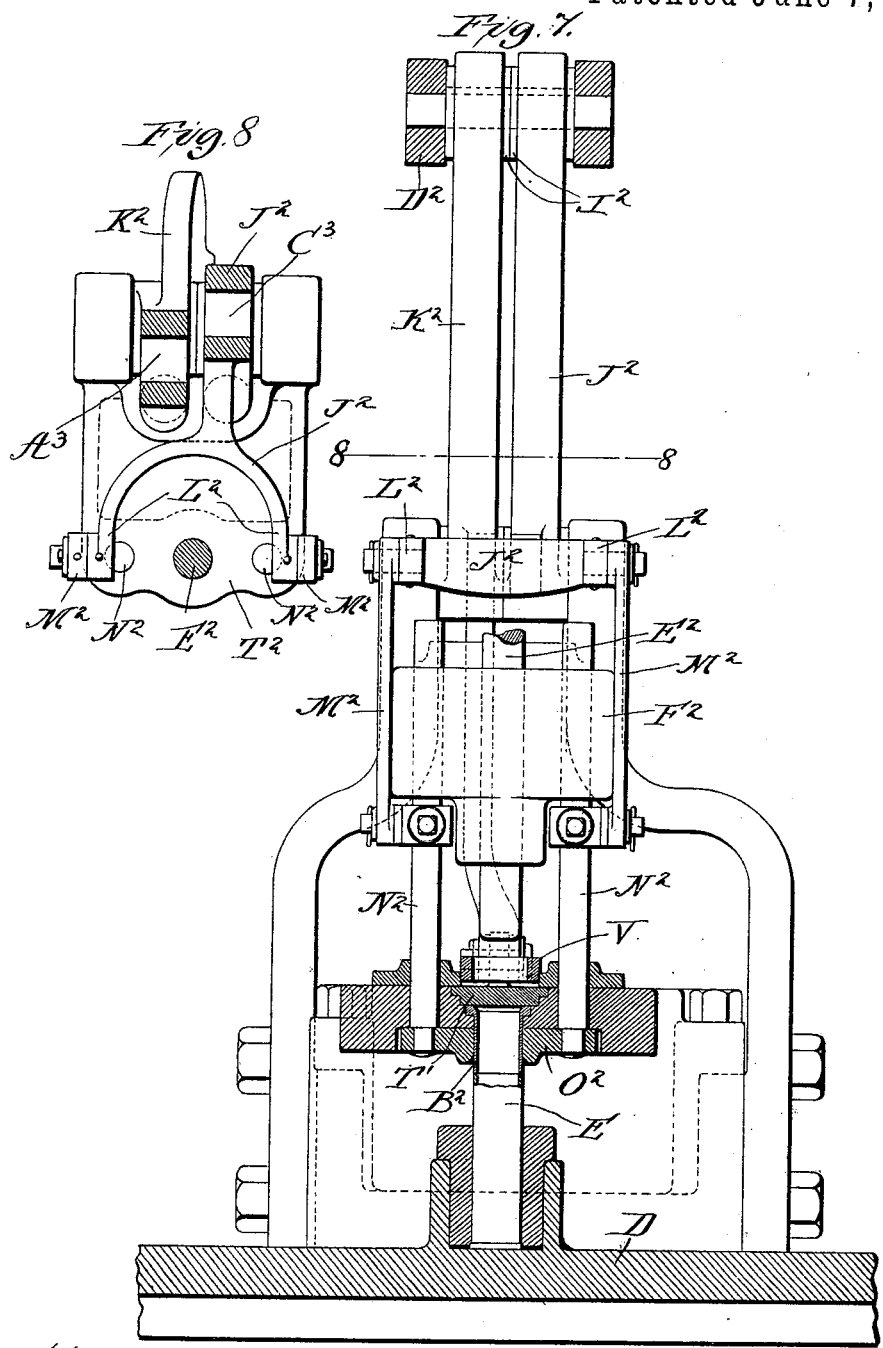

UNITED STATES PATENT OFFICE.

GERSHOM MOORE PETERS, OF CINCINNATI, OHIO, ASSIGNOR TO THE PETERS CARTRIDGE COMPANY, OF SAME PLACE.

WAD-PLACING MECHANISM FOR CARTRIDGE-MACHINES.

SPECIFICATION forming part of Letters Patent No. 605,258, dated June 7, 1898.

Application filed April 5, 1897. Serial No. 630,750. (No model.)

*To all whom it may concern:*

Be it known that I, GERSHOM MOORE PETERS, a citizen of the United States, residing at Cincinnati, in the county of Hamilton and State of Ohio, have invented a new and useful Wad-Placing Mechanism for Cartridge-Machines, of which the following is a specification.

This invention relates to wad-placing mechanism for cartridge-machines.

The object of the invention is to provide means for feeding and placing previously-formed wads and inserting the same in the cartridge-shells.

The invention consists, substantially, in the construction, combination, location, and relative arrangement of parts, all as will be more fully hereinafter set forth, as shown in the accompanying drawings, and finally specifically pointed out in the appended claims.

Referring to the accompanying drawings and to the various views and reference-signs appearing thereon, Figure 1 is a view in central vertical section of a cartridge-loading machine, showing in side elevation the wad feeding, placing, and inserting mechanism embodying my invention applied thereto, the loading devices, which do not form any part of the present invention, being omitted from the machine. Fig. 2 is a view in side elevation of the machine, the upper part being broken away, showing the arrangement for actuating the several wad-feeding devices. Fig. 3 is a view in plan of the machine, indicating the relative arrangement of features embodying the principles of my invention. Fig. 4 is a horizontal sectional view on the line 4 4, Fig. 1. Fig. 5 is an enlarged vertical central sectional view of the wad feeding, placing, and inserting mechanism, parts being broken away. Fig. 6 is a view in plan, parts in horizontal section and parts broken away, showing the construction and relative arrangement of the wad-distributing disk and the wad-feeding disk. Fig. 7 is a view, partly in side elevation and partly in vertical section, showing the arrangement and manner of mounting the cam-levers, the housing of the rammer, and the construction and arrangement for effecting an insertion of the wads in the shell-cases. Fig. 8 is a transverse sectional view on the line 8 8, Fig. 7. Fig. 9 is a detached detail view, in vertical transverse section, on the line 9 9, Fig. 6, showing the adjustable guard-plate for the distributing-channel. Fig. 10 is a similar view on the line 10 10, Fig. 6, showing the adjustable gate through which the wads are forced into the distributing-channel. Fig. 11 is a detached broken detail view in plan, showing the wad-placing jaws preparatory to grasping a wad. Fig. 12 is a similar view showing the placing-jaws after being advanced to position for a wad to be inserted in the shell.

The same part is designated by the same reference-sign wherever it occurs throughout the several views.

In the drawings reference-sign A designates a suitable framework of a cartridge-loading machine. Inasmuch as the present invention does not pertain to the construction or arrangement of the loading devices, I have not deemed it necessary to show or describe any particular form of such mechanism, it being understood that my invention may be applied with equal facility to many or any particular type of cartridge making or loading machine.

As illustrative of a well-known type of machine to which my invention is applicable, I have shown parts of what is known in the art as a "round-table" machine, wherein is employed a central main or operating shaft B, arranged to be reciprocated vertically in any suitable, convenient, or well-known manner and adapted by the movements thereof to operate the various devices distributed about it. I have also shown a suitable stationary table C, supported upon the framework of the machine and upon which the stationary parts of the several loading devices are carried, and a rotary table D, carrying the shell-cases, suitably sleeved upon shaft B and adapted to properly present the shells E to the loading-tools, including the wad-inserting mechanism, as most clearly shown in Fig. 5. The table D is provided with a tubular extension F, Fig. 1, adapted to form a bearing for the shaft B.

The construction so far described refers to a type of machine heretofore patented by me and forms no part of the present invention, except as to the coöperative relation of the various parts mentioned with the features constituting my present invention and presently to be more fully described; and it is evident that my invention is not confined in its use to the particular type of machine above outlined and referred to.

Suitably journaled in the framework of the machine or a hanger A' and preferably adjacent to the outer periphery of table C, as clearly indicated in Figs. 1, 2, 4, and 5, are the vertical shafts B', preferably, though not necessarily, four in number, as indicated. These shafts may be rotated in any suitable or desirable manner. I have shown a convenient and satisfactory arrangement for accomplishing this end, wherein a pulley L is mounted on each of said shafts, to which rotation is imparted through a belt connection C' from a pulley I. This pulley I is a combined driving and driven pulley, having flanges thereon adapted to receive the belt connections C', and also adapted to receive a belt D' from a pulley J upon shaft K, suitably journaled in the machine-frame and driven from any suitable or convenient source or arrangement of drive-gearing. In the particular form of machine shown I employ the crimper-actuating shaft for this purpose. The combined pulley I is mounted upon a sleeve E', which in turn is sleeved upon the extension F of table D, said sleeve E' being suitably reduced at the end thereof to receive said combined pulley. A bushing G, of brass or other suitable material, may, if desired, be interposed between the sleeve E' and the bore of pulley I to form a lining for said pulley and to present a suitable wearing-surface therefor. The pulley I is held in place upon sleeve E' in any suitable manner, as by means of a collar H.

From the foregoing description it will be readily seen that I produce a simple and effective arrangement for driving the shafts B'.

Mounted upon to rotate with each of the shafts B' is a disk M, which I will designate the "distributing-disk." This disk is arranged with the upper surface thereof in a horizontal plane. Suitably journaled or otherwise mounted in the framework of the machine or upon the fixed table C is a similar disk N, which I will designate the "feed-disk." These disks are preferably arranged in proximity to each other and with the upper surfaces thereof arranged in the same horizontal plane. The disk M may be and in practice preferably is of much larger diameter than that of disk N. Any suitably-arranged gearing may be provided for rotating the feeding-disk N in a reverse direction with respect to the direction of rotation of disk M. In the particular construction shown, to which, however, my invention is not limited, I provide a short shaft F', suitably journaled in the framework, and arrange the same to be driven from shaft B' through the bevel-gears O and to drive the shaft-carrying disk N through the bevel-gears O'; but of course any other suitable or convenient form of gearing adapted to the required purpose may be employed.

Suitably supported upon a fixed part of the framework is a hopper P, said hopper being preferably circular in form and open-ended and arranged over the distributing-disk M, and with the lower edge or end thereof just sufficiently raised above the top surface of said disk to avoid friction as said disk is rotated. Thus it will be seen that the disk M forms a rotary bottom for said stationarily-held hopper. The hopper is of smaller diameter than the diameter of the disk, so that said disk will project beyond the circumference of the hopper for a purpose that will presently appear more clearly. The lower edge of the hopper is provided with an opening therethrough, as indicated at G', Fig. 10, and which opening is controlled by an adjustable gate Q. This opening G' is just sufficient to enable wads to pass therethrough flatwise singly and without riding upon each other, and by making the gate Q adjustable I am enabled to regulate the size of such opening, thereby accommodating the apparatus to wads of different thickness, as occasion may require. Suitably mounted on a stationary part of the frame or table and arranged concentrically with the hopper, but of larger diameter than said hopper, is a flange H', said flange, hopper, and the projecting portion of the periphery of the disk M together forming a channel R, conforming to the curvature of the hopper and periphery of the disk M, the parts being so relatively arranged and proportioned that such channel is of just sufficient dimension to accommodate wads lying flatwise and in single column. In order to prevent the wads from climbing upon each other during the operation of the apparatus and while being advanced through said channel and in order to maintain them in proper relation, I provide a suitable guard-plate U and arrange the same within channel R after the fashion of a top therefor, and in order to accommodate different thicknesses of wads I make such plate vertically adjustable, as most clearly indicated in Fig. 9. This guard-plate is preferably supported, as shown, upon the hopper P. The channel R is arranged to extend peripherally around the disk M and leads therefrom in a reverse direction to and upon the feeding-disk N, the flange H' being suitably continued, as shown, and coöperating with an extension J' to form such continuation of the channel, as most clearly shown in Fig. 6. The operation of this part of my invention is as follows: The wads S are dumped promiscuously into hopper P, and inasmuch as disk M forms the bottom of said hopper the wads rest upon the upper surface of said disk. The rapid rotary motion imparted to the disk in the direction indicated by the arrow in Fig. 6 causes the wads S to be moved by centrifugal motion toward the periphery of said disk and to pass flatwise out of hopper P through the opening G', controlled by the adjustable gate Q, singly and in single file and into the channel R. The continued rotation of the distributing-disk advances the wads in single file and without riders through the channel R and deposits the same upon the feeding-disk N, by which they are advanced to the delivery end of said channel, as most clearly indicated in Fig. 11. At this point the wads are received singly by the placing mechanism, presently to be described, and advanced into position to be inserted in the shells E.

I will now describe the construction, arrangement, function, and mode of operation of the wad-placing mechanism.

Reference-signs T T' designate coöperating clamping-jaws suitably mounted to be moved in a line transverse with respect to the delivery end of channel R. The jaws are preferably mounted to slide in suitable guides formed in the framework or fixed part of the table. The jaws on their adjacent or meeting edges are provided with registering semicircular seats shaped to conform to the contour of and of a size adapted to receive therein the wads singly (see Figs. 11 and 12) and to clamp and hold the wads when said abutting ends of the jaws are brought together. The jaws are suitably connected to move together; but in order to enable the wads to be readily and easily received in the seat formed by the registering grooves in the abutting ends of said jaws it is important to provide means for separating said jaws, so as to leave sufficient space for the wads to enter the seat, and in order to avoid injury to the wads it is important to provide a yielding connection between said jaws, whereby a desirable degree of flexibility or resilience may be secured. Many different specific forms of mechanism may be employed for accomplishing the desired result. While, therefore, I have shown and will now describe a specific form of apparatus embodying these ideas, I desire it to be understood that my invention is not limited or confined thereto. In the particular form shown I provide a link V, suitably pivoted at one end to the jaw T and carrying or having cast therewith a rod V' at the other end thereof, which is arranged to be seated in a slot formed in a lug Y on jaw T'. By this means the link may be readily raised or rocked about its pivot in order to disconnect said jaws. The rod V' is threaded at the free end thereof and suitable nuts X mounted thereon, and a spring W, interposed between said nuts and the lug Y, serves to secure the yielding connection between the jaws above referred to. By suitably adjusting the nuts the tension of the spring may be regulated according to the requirements. The jaw T' is provided with a lug or projection $A^2$, arranged to engage a stationary part of the frame or table in which the jaws operate, which engagement, during the movement of the jaws in a direction to receive the wads, serves to cause the jaws to separate against the action of spring W, whereby the wad may be received between the jaws. From this description it will be seen that by moving the jaw T in one direction the two jaws move together by reason of the connection between them until the lug $A^2$ strikes the stationary part W' of the frame, whereupon the movement of jaw T' is arrested, while the movement of jaw T continues. This point in the operation is attained just as the jaws reach the delivery end of the channel R, and the continued movement of jaw T separates said jaw from jaw T', thereby providing sufficient space between said jaws for a wad to be fed therebetween from the delivery end of the channel R by the feeding-disk N, which, it will be remembered, is continuously rotating. After the wad has been received in place and upon movement of the jaw T in the opposite direction the wad is clamped and held in place in the circular seat formed by the registering semicircular grooves in the meeting edges of the jaws T T'. Continued movement of jaw T advances the two jaws with the wad clamped and held therebetween into position for the wad to be inserted in the shell, the limit of movement of the clamping-jaws being such as to bring the wad in line with the shell E, carried by the table D, and the parts being so timed in their conjoint operation that a shell is brought into position to receive a wad and is held in such position at the time the wad is advanced and during the operation of inserting the wad, as will presently be more fully described. The jaw T is so relatively arranged and located with respect to the delivery end of the channel R that when said jaw is advanced to carry the wad into position to be inserted in the shell-case it forms a cut-off for the column or file of wads contained in the channel.

Many specifically different forms of mechanism may be employed to effect the movements of the jaws. I have shown and will now describe what I have found to be a simple, convenient, and effective arrangement for accomplishing the desired object; but I do not desire to be limited or restricted to the construction and arrangement shown, as many changes therein and variations therefrom would readily suggest themselves to persons skilled in the art and still fall within the spirit and scope of my invention. In the particular form shown I provide a head-block $C^2$ and mount the same upon and to reciprocate with shaft B. This head-block is provided with an arm $D^2$, which arm carries at the outer end thereof suitable antifriction-rollers $I^2$. Upon a fixed part $F^2$ of the framework I pivotally mount a lever $K^2$, the lower end of such lever having pivotal connection with clamping-jaw T and the upper end of such lever being slotted, as shown at $A^3$, and the antifriction-roller $I^2$ is arranged to play up and down in said slot. The walls of the slot are formed in straight lines at the ends thereof, as clearly shown in Fig. 5, while at a point intermediate the ends the walls of the slot are somewhat abruptly bent out of alinement with the straight end portions thereof, as indicated at $B^3$. The lower end of the lever $K^2$ is suitably curved, so as to be permitted a rocking movement without striking its supporting-frame $F^2$.

From this description it will be seen that as the head $C^2$ and arm $D^2$, carried thereby, begin to descend from the upper limit of their movement the roller $I^2$ will descend at first between the straight walls at the upper end of slot $A^3$, and a movement of the lever $K^2$ will result in a direction to advance the jaws T T' to a point where the wads are in line with the shells. When the bend $B^3$ in the slot $A^3$ is reached, the lever $K^2$ will be rocked to the limit of its stroke in the direction to advance the jaws T T' into position to be inserted in the shell. The continued downward movement of the head $C^2$ and arm $D^2$ causes the roller $I^2$ to enter and proceed along the straight portion of the slot $A^3$ at the lower end thereof, thereby locking the lever $K^2$ against movement a sufficient length of time to permit the wad-inserting mechanism to perform its function. When the head $D^2$ begins to ascend, roller $I^2$ rides in the straight-walled portion of slot $A^3$ until the bend $B^3$ is reached without effecting a movement of the lever $K^2$; but after the bend $B^3$ is passed the straight walls of the slot at the upper end thereof effect a rocking of lever $K^2$ in a direction to return the clamping-jaws T T' to position to receive and clamp another wad.

Many specifically different forms of mechanism may be employed for effecting the insertion of the wads into the shell-cases. I have shown and will now describe a construction and arrangement which I have found to be simple and efficient, but to which I do not desire to be limited or restricted, as many changes therefrom and alterations therein would readily suggest themselves to persons skilled in the art and still fall within the spirit and scope of my invention. In the form shown I provide a rammer $E^2$, which I suitably arrange in longitudinal alinement with the shell when brought into position to receive the wad, and hence also in alinement with the wad when held in position to be inserted in the shell. The rammer may be supported and actuated in any suitable or convenient manner, the operation thereof being so timed with reference to the other parts of the machine that it will advance to its work while the clamping-jaws T T', carrying a wad, are held stationarily in position to have the wad inserted in the shell and while the shell is held stationarily in position to receive the wad, said rammer being advanced and returned a sufficient distance to clear the upper end of the shell-case before any movement of the table D takes place and being withdrawn a sufficient distance to clear the jaws T T' before said jaws begin their return movement to receive another wad. I have shown a convenient arrangement for securing this conjoint movement, wherein I arrange the rammer to be supported in a suitable bearing in the arm $D^2$ of head $C^2$, as clearly shown in the drawings, whereby said rammer partakes of the movements of said head and arm, and in order to secure the desired alinement of the rammer during its longitudinal movements I also provide a bearing for the rammer in the stationary part $F^2$ of the framework. In order that the rammer may properly perform its function of inserting and ramming the wad home in the shell with the desired force and pressure, I mount on the upper end thereof a series of weights $G^2$. In practice I prefer to make these weights removable, and I graduate them as to size, whereby the amount of pressure or force exerted upon the wad in ramming it home in the shell-case may be suitably regulated as required by varying conditions, and in order that the full effect of the weights may be secured I mount the rammer to slide freely in its bearing in arm $D^2$ and I provide check-nuts $H^2$ thereon, both above and below such bearing, whereby a relative movement of the rammer and arm $D^2$ may be secured, which relative movement may be adjusted as to extent by suitably adjusting the set-nuts $H^2$. By this arrangement I avoid injury to the shell, due to rigidity in the rammer-support, a desirable degree of yielding of the rammer being permitted in my construction should occasion therefor arise.

It is important to provide means for guiding the wads to the shell-case. To accomplish this object and at the same time to provide means whereby the wads may be slightly compressed diametrically, thereby enabling them to be readily and easily inserted in the shells, I provide a tube $B^2$ of an internal diameter slightly less than that of the wads and arrange the same in the fixed part of the frame in which the clamping-jaws T T' slide, in true alinement with the rammer $E^2$, the shell E, when in position to receive the wad, and the seat between clamping-jaws T T', in which the wad is held while in position for the rammer to advance. The upper end of this tube $B^2$ is slightly flared, as shown, to facilitate the entrance of the wad as it is forced from between the jaws T T' by the advancing rammer. The lower end of tube $B^2$ terminates in close proximity to the upper ends of the shells as they are successively brought into register therewith by the table D, and hence said tube, being of an internal diameter slightly less than the diameter of the wads, forms a channel through which the wads are forced by the rammer, whereby the wad is guided and is prevented from tilting edgewise while being inserted in the shell, and also slightly compresses the wads, whereby they may be readily and easily inserted in the shells. In order to aid the tube $B^2$ as a guide for the wads and to hold the shell, and support the same, thereby preventing the upper end thereof from being injured or crushed during the operation of inserting the wads and at the same time to round up the shell if it should be out of shape, I provide what I shall designate a "cap" $O^2$, in which is provided a circular opening of an internal diameter sufficient to fit snugly but easily over the tube $B^2$ and also over the shell E at the proper time in the operation of the machine, and in order to facilitate the slipping of this cap over the upper end of the shell I slightly flare the lower edge of the opening or perforation through said cap, as clearly shown in Fig. 7. The cap $O^2$ is supported and carried by pistons $N^2$, mounted to slide vertically in bearings in the part $F^2$ of the frame and also in that part of the frame in which the jaws T T' slide. Pivotally mounted on the frame $F^2$ is a bell-crank lever $J^2$, having one arm thereof slotted, as at $C^3$, in which slot is adapted to be received one of the rollers $I^2$, carried by the outer end of arm $D^2$. The other arm of said lever is forked, as shown, and the forked ends $L^2$ are connected by links $M^2$ to the rods or plungers $N^2$. At the extremities of the slot $C^3$ the walls thereof are straight; but at a point intermediate the ends of said slot said walls are provided with a sharp angular bend, as at $D^3$. From this construction it will be seen that up and down movements of the head $C^2$ and arm $D^2$ in the operation of the machine imparts a rocking motion to lever $J^2$ by reason of the riding of the roller $I^2$ in the cam-slot $C^3$. The parts are so relatively arranged, proportioned, and timed that just as the wad is being forced from between jaws T and T' and thence into the upper end of the tube $B^2$ by the advancing movement of rammer $E^2$ the roller $I^2$ arrives at that point in the slot $C^3$ where lever $J^2$ is rocked in a direction for the cap $O^2$ to be slipped over the end of the shell. Of course when this point in the operation of the machine is attained the table D, carrying the shell-cases, is held stationary. The provision of the straight walls of the slot $C^3$ at the lower end thereof serves to maintain the cap $O^2$ in its position with the shell projecting into the opening or perforation in said cap, thus forming a support for the shell during the operation of the wad-inserting mechanism. As soon as the rammer has been withdrawn and before the table D begins to move the parts should be so timed and arranged as to lift the cap $O^2$ off of the shell. In order to give the rollers $I^2$ a sufficient amount of play in slots $A^3$ and $C^3$ so as not to bind therein, and also in order to compensate for wear and lost motion, while at the same time maintaining a proper centering and timing of the several parts, I provide springs $P^2$, arranged to press against levers $J^2 K^2$, normally tending to insure the elevation of the cap $O^2$ and the bringing of the clamping-jaws T T' in exact position for the contained wad to be carried down into the shell E, the stop $A^4$ being provided, against which jaws T T' are pressed, said stop being held by a set-screw, so that it can be readily dropped to permit the slide to be withdrawn for repairs.

In order that link V may not offer any obstruction to the advancement of rammer $E^2$ to its work, I arrange said rammer to pass through the elongated opening in said link, as clearly shown in Fig. 5.

From the foregoing description, taken in connection with the accompanying drawings, it is believed that the operation of the machine will be readily understood by persons skilled in the art.

I am aware of the application for a patent filed March 26, 1894, Serial No. 505,203, for machines for priming or capping the heads of cartridge-shells, by William B. Place; but I do not wish to be understood as herein claiming anything which conflicts with the subject-matter of said Place application.

Having now set forth the object and nature of my invention and a form of apparatus embodying the same, and having described the construction, function, and mode of operation thereof, what I claim as new and useful and of my own invention, and desire to secure by Letters Patent of the United States, is—

1. In a wad-placing device for cartridge-machines, a distributing-disk and a feeding-disk, said disks arranged in substantially the same horizontal plane, the wads to be distributed and fed adapted to rest upon the top surface of the said disks, and to be delivered from the top surface of said distributing-disk to that of the feeding-disk, and means for actuating said disks; as and for the purpose set forth.

2. In a wad-placing device for cartridge-machines, a distributing-disk and a feeding-disk, the supporting-surfaces of said disks arranged in substantially the same horizontal plane, the wads to be distributed and fed adapted to rest upon said surfaces, and means for rotating said disks in opposite directions, whereby the wads are delivered from the top surface of said distributing-disk to the top surface of said feeding-disk, as and for the purpose set forth.

3. In a wad-placing device for cartridge-machines, a hopper, a disk arranged to form the bottom of said hopper and adapted to support upon the top surface thereof the wads to be distributed, and a feeding-disk arranged adjacent to and in substantially the same horizontal plane with the said first-mentioned disk and adapted to receive on the top surface thereof the wads from said feeding-disk, and means for rotating said disks in opposite directions, as and for the purpose set forth.

4. In a machine of the class described, a hopper, a channel or guideway, a disk forming the bottom of said hopper and channel, a gate or opening communicating between said hopper and channel, in combination with a wad-feeding disk arranged to receive upon the top surface thereof the wads from the said first-mentioned disk and means for rotating said disks, as and for the purpose set forth.

5. In a machine of the class described, a hopper, a channel or guideway, a gate or opening communicating between said hopper and channel, means for adjusting the area of said opening, in combination with a disk forming the bottom of said hopper and channel, and means for rotating said disk, as and for the purpose set forth.

6. In a machine of the class described, a hopper, a channel, an opening formed in said hopper and communicating with said channel, a top plate or guard for said channel, and means for adjusting the same, in combination with a distributing-disk forming the bottom of said hopper and channel, and means for rotating said disk, as and for the purpose set forth.

7. In a machine of the class described, a stationary flange, a stationary hopper arranged within said flange and concentric therewith, said flange and hopper forming the side walls of a channel, a gate forming a communication between said hopper and channel, a disk arranged to form a bottom for said hopper and channel in combination with a wad-feeding disk arranged to receive upon the top surface thereof the wads from the said first-mentioned disk and means for rotating said disks, as and for the purpose set forth.

8. In a machine of the class described, a stationary flange, a stationary hopper arranged within said flange forming a channel therewith, said hopper provided with a gate opening communication between said hopper and channel, a disk arranged to form a bottom for said hopper and channel, and a second disk arranged adjacent to said first-mentioned disk and upon the top surface of which said channel delivers, and means for rotating said disks, as and for the purpose set forth.

9. In a machine of the class described, a circular distributing-disk, a stationary flange arranged to conform to the curvature of said disk, a hopper arranged within said flange and in conjunction therewith forming a channel, said hopper provided with a gate opening communication between said channel and the interior of said hopper, said distributing-disk arranged to form a bottom for said hopper and channel, an adjustable top or guard for said channel, a feeding-disk arranged adjacent to said distributing-disk and upon which said channel delivers, and means for rotating said disks in opposite directions, as and for the purpose set forth.

10. In a machine of the class described, a guideway for the wads, means for feeding the wads through said guideway, a top guard for said guideway, whereby said wads are fed singly and in single column, and means for adjusting said top guard to accommodate wads of different thicknesses, as and for the purpose set forth.

11. In a machine of the class described, a distributing-disk, and a feed-disk, in combination with devices for placing the wads, and devices for inserting the wads in the shells, as and for the purpose set forth.

12. In a machine of the class described, the combination with means for feeding the shells, of a wad-distributing disk, a wad-feeding disk, means for receiving the wads and placing the same in position to be inserted in the shells, means for inserting the wads in the shells, and means for actuating said several devices, as and for the purpose set forth.

13. In a wad-placing device for cartridge-machines, the combination with a feed-disk, a distributing-disk for delivering the wads thereto and means for actuating the same, of a wad-placing device comprising a pair of jaws, adapted to receive therebetween the wads singly from such feed-disk, and means for actuating said jaws, as and for the purpose set forth.

14. In a wad-placing device for cartridge-machines, the combination with a feedway or channel, a feed-disk arranged to form the bottom of said feedway or channel, means for automatically delivering the wads upon said feed-disks and means for rotating said disk, of a wad-placing device comprising a pair of jaws arranged to reciprocate transversely of the delivery end of such channel, and adapted to receive the wads therebetween, and means for reciprocating said jaws, as and for the purpose set forth.

15. In a wad-placing device for cartridge-machines, the combination with means for feeding the wads singly and in single column, of a placing mechanism, including a pair of clamping-jaws yieldingly coupled together, a stop for one of said jaws, and means for reciprocating said jaws, as and for the purpose set forth.

16. In a wad-placing device for cartridge-machines, the combination with means for feeding the wads singly and in single column, of a guideway arranged transverse to the line of feed of the wads, a pair of clamping-jaws arranged to operate therein, a yielding connection between said jaws whereby they are moved in unison but are permitted to yieldingly separate, a stop for one of said jaws adapted to engage a stationary part, and means for reciprocating said jaws, as and for the purpose set forth.

17. In a wad-placing device for cartridge-machines, the combination with means for feeding the wads singly and in single file, a guideway arranged transversely to the line of feed of the wads, clamping-jaws mounted to reciprocate in said guideway, a link connected to one of said jaws, a spring interposed between said link and the other of said jaws, a stop for one of said jaws, and means for reciprocating said jaws, as and for the purpose set forth.

18. In a wad-placing device for cartridge-machines, the combination with means for feeding the wads singly and in single file, a guideway arranged transverse to the line of feed of the wads, clamping-jaws mounted to reciprocate in said guideway, a link pivoted to one of said jaws, and carrying a threaded rod, a spring arranged on said rod and adapted to bear against a lug on the other of said jaws, means for regulating the tension of said spring, a stop carried by said last-mentioned jaw, and means for reciprocating said jaws, as and for the purpose set forth.

19. In a machine of the class described, a distributing-disk and an adjacent, oppositely-moving feeding-disk, and a placing mechanism in combination with a guideway for receiving the wads singly from the distributing-disk and extending to and across the feeding-disk, and delivering to the placing mechanism, as and for the purpose set forth.

20. In a wad-placing device for cartridge-machines, clamping-jaws, a slotted lever pivotally mounted and connected to said jaws, the slot in said lever being cam-shaped, a reciprocating head, means carried thereby and adapted to ride in said cam-slot whereby said lever is rocked, a stop for said jaws, and a spring mounted to act on said lever and normally acting to press said jaws against said stop, whereby lost motion is taken up, as and for the purpose set forth.

21. In a wad-placing device for cartridge-machines, a stationarily-held tube, having the upper end thereof slightly flared, clamping-jaws arranged to transport and hold the wads in alinement with said tube and a rammer arranged to force the wads from said pivot and through said tube, in combination with means for presenting the shells in longitudinal alinement with said tube, as and for the purpose set forth.

22. In a wad-placing device for cartridge-machines, a stationarily-held tube, having the upper end thereof flared, means for placing and holding the wads in line with the tube and over the upper flared end thereof, a rammer arranged in line with said tube, means for actuating the same to force the wads through said tube, and means for presenting the shells in line with said tube, as and for the purpose set forth.

23. In a machine of the class described, means for placing and inserting the wads in cartridge-shells, in combination with a movable cap arranged to slip over the end of a shell during the operation of said inserting means whereby the shell is rounded up and steadied, as and for the purpose set forth.

24. In a machine of the class described, wad placing and inserting devices, means for actuating the same, and means for presenting the shells to said devices, in combination with means for rounding up a shell and maintaining the same in alinement with the inserting devices, comprising a movable cap, and means for slipping the same over the shell preparatory to the introduction of the wads thereto, as and for the purpose set forth.

25. In a machine of the class described, wad placing and inserting devices and shell-feeding mechanism, in combination with a perforated cap arranged to be slipped over the end of the shell during the operation of the inserting mechanism, whereby the shell is rounded up and maintained in proper alinement, and means for actuating said cap, as and for the purpose set forth.

26. In a machine of the class described, wad placing and inserting devices, and shell-feeding mechanism, in combination with a perforated cap-plate, the lower mouth of said cap-plate being flared, and means for slipping said cap over the shell during the action of the inserting mechanism, as and for the purpose set forth.

27. In a machine of the class described, wad placing and inserting devices, and shell-feeding mechanism, in combination with an alining-cap, and means for depressing said cap upon the shell during the operation of the inserting devices, as and for the purpose set forth.

28. In a machine of the class described, an alining-cap, means normally acting to maintain said cap elevated above the path of feed of the shell, and means for depressing said cap, as and for the purpose set forth.

29. In a machine of the class described, an alining-cap, a lever, connected to said cap, a spring arranged to act on said lever and normally operating to maintain said cap elevated, and means for rocking said lever to depress said cap, as an and for the purpose set forth.

30. In a machine of the class described, an alining-cap for the shells, reciprocating rods carrying said cap, a pivotally-mounted lever connected to said rods, and means for actuating said lever, as and for the purpose set forth.

31. In a machine of the class described, an alining-cap for the shells, rods upon which said cap is mounted, a bell-crank lever, having one arm connected to said rods and the other arm thereof provided with a cam-slot, a reciprocating head and means carried thereby for engaging said cam-slot, whereby said cap-plate is actuated, as and for the purpose set forth.

32. In a machine of the class described, a framework, a reciprocating head mounted therein, a bearing formed in said head, a rammer mounted to slide loosely through said bearing, a removable weight mounted on said rammer, and a guide formed in said framework for said rammer, as and for the purpose set forth.

33. In a machine of the class described, a framework, a reciprocating head mounted therein, a bearing formed in said head, a rammer loosely mounted to slide in said bearing, a series of removable weights mounted on said rammer, and a guide for said rammer formed in said framework, as and for the purpose set forth.

34. In a machine of the class described, a framework, a reciprocating head mounted therein, a bearing formed in said head, a rammer loosely mounted to slide in said bearing, a plurality of variously-sized weights removably mounted on said rammer, and a guide formed in said framework for said rammer, as and for the purpose set forth.

35. In a machine of the class described, a reciprocating head, a bearing formed therein, a rammer loosely mounted to slide in said bearing, a weight carried by said rammer and means for adjustably regulating the amount of the relative movement of said rammer and head, as and for the purpose set forth.

36. In a machine of the class described, a reciprocating head, a bearing formed therein, a rammer loosely mounted to slide in said bearing, an adjustable weight mounted on said rammer, and a check-nut arranged to adjustably regulate the relative movement of said rammer and head, as and for the purpose set forth.

37. In a machine of the class described, a reciprocating head, having a bearing therein, a rammer mounted to slide in said bearing, check-nuts carried by said rammer above and below said bearing, and removable weights carried by said rammer, as and for the purpose set forth.

38. In a wad-placing device for cartridge-machines, a table for feeding the shells, a series of wad-distributing and wad-feeding disks arranged around the periphery of said table, a pulley, means for driving said pulley, and belt connections from said pulley for actuating said several wad distributing and feeding disks, as and for the purpose set forth.

39. In a wad-placing device for cartridge-machines, a table having an extension and adapted to support and feed the shells, wad distributing and feeding disks mounted on each extension, a pulley mounted on said extension, means for driving said pulley, and means driven by said pulley for actuating said wad distributing and feeding disks, as and for the purpose set forth.

40. In a machine of the class described, a wad-distributing disk, a wad-feeding disk, a channel arranged to extend from one of said disks to the other and adapted to contain and feed the wads singly and in single file, wad-placing jaws, a rammer, a guiding-tube, an alining-cap, a shell-case-feeding table, and means for actuating said several devices, all combined and arranged as and for the purpose set forth.

41. In a machine of the class described, two oppositely-rotating disks arranged adjacent to each other, and in substantially the same horizontal plane and a guideway arranged to extend over the surface of both disks, as and for the purpose set forth.

42. In a machine of the class described, two oppositely-rotating disks arranged adjacent to each other, and in substantially the same horizontal plane and a guideway arranged to extend over the surface of both disks, and conforming to the direction of rotation of said disks, as and for the purpose set forth.

43. In a machine of the class described, a framework, a reciprocating head mounted therein, a bearing formed in said head, a rammer loosely mounted to slide in said bearing and a plurality of variously-sized weights removably mounted on said rammer, as and for the purpose set forth.

In witness whereof I have hereunto set my hand, this 30th day of March, 1897, in the presence of the subscribing witnesses.

GERSHOM MOORE PETERS.

Attest:
J. H. McKIBBEN,
F. C. TUTTLE.